(No Model.)

D. DUNN.
BEER PUMP AND AERATING DEVICE.

No. 377,711. Patented Feb. 7, 1888.

WITNESSES
F. L. Durand
Benj. H. Cowl

Dennis Dunn,
INVENTOR
by Louis Bagger & Co.
Attorneys

UNITED STATES PATENT OFFICE.

DENNIS DUNN, OF MAHANOY CITY, PENNSYLVANIA.

BEER-PUMP AND AERATING DEVICE.

SPECIFICATION forming part of Letters Patent No. 377,711, dated February 7, 1888.

Application filed September 30, 1887. Serial No. 251,137. (No model.)

*To all whom it may concern:*

Be it known that I, DENNIS DUNN, a citizen of the United States, and a resident of Mahanoy City, in the county of Schuylkill and State of Pennsylvania, have invented certain new and useful Improvements in Beer-Pumps and Aerating Devices; and I do hereby declare that the following is a full, clear, and exact description of the invention, which will enable others skilled in the art to which it appertains to make and use the same, reference being had to the accompanying drawings, which form a part of this specification, and in which—

Figure 1:
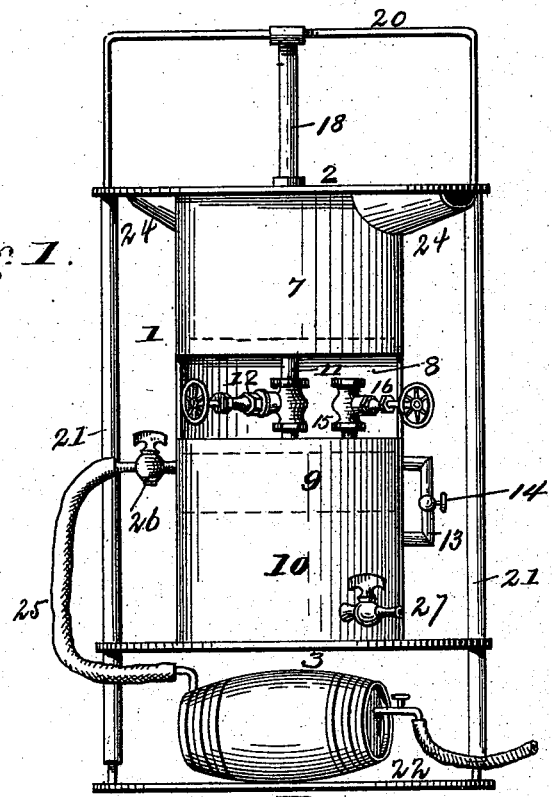
Figure 2:
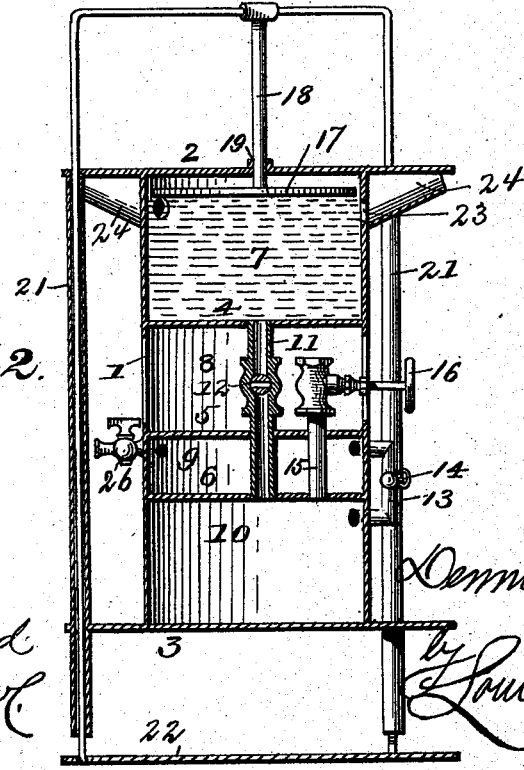

Figure 1 is a side elevation of my new and improved beer-pump and aerating device, and Fig. 2 is a vertical sectional view of the same.

The same numerals of reference indicate corresponding parts in both the figures.

My invention consists in a new and improved beer-pump and aerating device, which will be hereinafter fully described and claimed.

Referring to the several parts by their designating numerals, 1 indicates the outer cylindrical casing of my new and improved device, which is closed at each end by the end plates, 2 3, the rims or flanges of which extend out, as shown. This cylindrical casing is divided by three transverse partitions, 4, 5, and 6, into four separate chambers or compartments, 7, 8, 9, and 10. The upper one, 7, of these chambers, into which the cylinder is divided, forms the reservoir or water-chamber, and has a capacity greater than that of a keg of beer. The bottom of this top chamber is connected by a pipe, 11, with the top of the bottom chamber, 10, as shown, the passage of water through this pipe from the upper to the lower chamber being controlled by a cock or valve, 12. The second chamber from the top is open on one side for convenience of access to the cocks of the water-pipe above described and of the air pipe or inlet hereinafter described. This second chamber is indicated by the reference-numeral 3.

9 indicates the third chamber from the top. This chamber is the air-chamber proper.

10 indicates the bottom chamber, which has the same capacity as the top or water chamber, 7. This bottom chamber is connected to the air-chamber 9 by the bent pipe 13, which has the central controlling-valve, 14. An air-inlet pipe, 15, leads from the top of the bottom chamber up to the open chamber 8, where its end is provided with a stop-cock or valve, 16.

In the top or water chamber plays a piston, 17, the rod 18 of which passes through a central aperture, 19, in the top plate of the cylindrical casing, and to the upper end of this piston-rod is centrally secured the rod 20, the ends of which are bent down at right angles and pass through bearings in the flanges of the top and bottom plates of the cylindrical casing, and preferably through tubular sleeves 21 21, connecting the said bearing-apertures in the end plates. To the lower ends of this frame-rod is secured a platform, 22, adapted to receive and support a keg of beer.

In operation the cylindrical casing is supported in a suitable manner so as to remain stationary, and the upper or water chamber, 7, is filled with water, after the piston has been raised to the top of the chamber, by pouring the water through either one of the two opposite inlet-openings 23 23, formed in the upper end of the said chamber, the said openings having the outer spouts or shields, 24 24, and the piston being raised above the said openings before the water is poured in. The object of having two openings is that when the water is poured in through either opening the air can escape through the other. The valve 12 is of course closed before the top chamber is filled. The keg of beer is now placed on the platform 22, and its rear end is connected by a tube, 25, with a faucet, 26, opening from the upper part of the air-chamber 9. The escape-cock 27 at the bottom of the lower chamber, 10, is closed, and also the valve 16 of the air-inlet pipe 15, which opens into the top of the air-chamber 9. The valve 14 of the connecting-pipe 13 is now adjusted to the required point to regulate the proportion of air which will enter the keg.

When a glass of beer is to be drawn, the operator opens the valve 12 of the pipe 11, when a portion of the water from the reservoir or top chamber will run down into the bottom chamber, thus compressing the air in the said bottom chamber. The compressed air in the bottom chamber quickly becomes strong enough to resist the pressure of the water; but the weight of the keg on the lower platform of the frame 20 22 will pull the piston 17 down in the upper chamber on the water, and thus force the air from the lower chamber, 10, through the bent pipe 13, through the air-chamber 9, and through the tube or pipe 25 into the rear end of the beer-keg, where it will aerate the beer, and at the same time force or pump it up and out through a suitable connecting-tube, 28, to the desired height.

It will be seen that a small quantity of the water from the reservoir will serve to pump a glass of beer from the keg, and as soon as the glass, or as much as is required, is drawn the valve or stop-cock 12 is again closed, the whole device being managed after it is once adjusted by this one valve. This operation is repeated until all of the beer is drawn from the keg, the capacity of the water-chamber being rather greater than that of the keg, so that it will not be necessary to refill the reservoir until the keg has been emptied and removed.

When the keg is empty, it is removed and the piston raised in the reservoir and the reservoir again filled with water. The water which has now filled the bottom chamber from the reservoir is now drawn off by the faucet 27, the valve 16 of the air-inlet pipe 15 being at the same time opened, so that as the bottom chamber is emptied of water through its bottom faucet, 27, the air will be drawn in through the pipe 15 to fill it, and when this chamber is empty of water and full of air the faucet 27 and the valve 16 are again closed, as before. A full keg of beer is then placed on the platform 22, when the device is again ready for operation.

From the foregoing description, taken in connection with the accompanying drawings, the construction, operation, and advantages of my invention will be readily understood.

It will be seen that my new and improved beer-pump and aerating device is simple and strong in construction and very convenient and efficient in its operation. The exact proportion of air entering each glass of beer can be accurately fixed by means of the valve 14, while the whole device is controlled in operation by the one valve 12. The device is to a certain extent automatic, as the weight of the beer-keg itself operates to force the air into itself.

Having thus described my invention, what I claim, and desire to secure by Letters Patent of the United States, is—

1. The combination of a casing having an upper chamber or reservoir, a bottom chamber, and an intermediate air-chamber, a pipe connecting the reservoir with the bottom chamber and having a controlling-valve, an air-inlet pipe connecting the bottom chamber with the exterior air, a pipe connecting the bottom chamber with the air-chamber, a faucet leading from the top of the air-chamber, a discharge-faucet in the bottom chamber, the frame, the bottom platform secured thereto, a piston within the reservoir, and the rod secured to the piston and passed through the top plate and connected with the frame.

2. The combination of the cylindrical casing having the top and bottom end plates having the perforated flanges and the transverse partitions, the reservoir having the two opposite openings near its upper end, the open chamber or space, the air-chamber having the faucet near its upper end, the bottom chamber having the discharge-faucet, the pipe connecting the reservoir with the bottom chamber and having the controlling-valve, the air-inlet pipe leading from the exterior air into the bottom chamber and having the controlling-valve, the bent connecting-pipe having the valve and connecting the bottom chamber with the air-chamber, the piston having the operating-rod, the frame having the bottom platform, and the tube connecting the faucet of the air-chamber with the keg on the platform, all substantially as and for the purpose herein set forth.

In testimony that I claim the foregoing as my own I have hereunto affixed my signature in presence of two witnesses.

DENNIS DUNN.

Witnesses:
THOMAS C. O'CONNOR,
JOHN CAMERON.